United States Patent
Bolger et al.

(10) Patent No.: US 10,889,191 B1
(45) Date of Patent: Jan. 12, 2021

(54) METHODS AND SYSTEM FOR LIMITING TORQUE IN A BEV

(71) Applicant: Ford Global Technologies, LLC, Dearborn, MI (US)

(72) Inventors: Bryan Michael Bolger, Canton, MI (US); Carol Louise Okubo, Dearborn, MI (US); Shunsuke Okubo, Belleville, MI (US); Justin Carmen Campanaro, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/592,649

(22) Filed: Oct. 3, 2019

(51) Int. Cl.
| | | |
|---|---|---|
| *B60L 58/14* | (2019.01) | |
| *B60L 15/20* | (2006.01) | |
| *B60L 50/60* | (2019.01) | |
| *B60L 58/16* | (2019.01) | |
| *H02P 23/16* | (2016.01) | |

(52) U.S. Cl.
CPC .......... *B60L 15/2045* (2013.01); *B60L 50/66* (2019.02); *B60L 58/14* (2019.02); *B60L 58/16* (2019.02); *H02P 23/16* (2016.02); *B60L 2240/14* (2013.01); *B60L 2240/26* (2013.01); *B60L 2240/423* (2013.01); *B60L 2240/461* (2013.01); *B60L 2240/463* (2013.01); *B60L 2240/54* (2013.01); *B60L 2240/662* (2013.01); *B60L 2250/28* (2013.01); *H02P 2205/03* (2013.01)

(58) Field of Classification Search
CPC .......... B60L 58/14; B60L 58/16; B60L 50/66; H02P 23/16
USPC .......................................................... 318/560
See application file for complete search history.

(56) References Cited

U.S. PATENT DOCUMENTS

| | | | | |
|---|---|---|---|---|
| 4,305,254 | A * | 12/1981 | Kawakatsu | B60W 10/08 60/716 |
| 6,452,286 | B1 * | 9/2002 | Kubo | B60W 10/08 290/40 C |
| 6,659,213 | B2 * | 12/2003 | Kubo | B60L 58/14 180/65.26 |
| 7,107,956 | B2 | 9/2006 | McGee et al. | |
| 8,725,329 | B1 * | 5/2014 | Snyder | B63H 20/14 701/21 |
| 2002/0063000 | A1 * | 5/2002 | Kojima | B60K 6/543 180/65.1 |
| 2007/0216247 | A1 * | 9/2007 | Lee | H02K 53/00 310/113 |
| 2010/0089671 | A1 | 4/2010 | Trunkenpolz | |
| 2011/0144837 | A1 * | 6/2011 | Heisel | B60W 10/06 701/22 |

* cited by examiner

*Primary Examiner* — Bentsu Ro
(74) *Attorney, Agent, or Firm* — David Kelley; McCoy Russell LLP (57) ABSTRACT

Methods and systems are provided for adjusting a torque delivered to wheels of an electrically propelled vehicle based on a battery discharge power. In one example, a method may include, during conditions of a lower than threshold battery output power, reducing the torque delivered to the vehicle wheels from a deliverable torque output.

20 Claims, 5 Drawing Sheets

METHODS AND SYSTEM FOR LIMITING TORQUE IN A BEV

FIELD

The present description relates generally to methods and systems for controlling torque delivered to wheels of a vehicle based on a battery discharge power. The methods and systems may be particularly useful for vehicles that are electrically propelled.

BACKGROUND/SUMMARY

Electric vehicles are selectively driven using one or more battery-powered electric machines. Electric vehicles may use electric machines instead of, or in addition to, an internal combustion engine. Example electric vehicles include battery electric vehicles (BEVs) with an energy storage device such as a battery containing multiple battery cells that store electrical power for powering the electric machine. The battery cells may be charged prior to use, and recharged during a drive by regeneration braking or an internal combustion engine. A discharge power limit of a battery may be based on physical characteristics and age of the battery, state of charge of the battery, and battery temperature. The discharge power limit is a maximum power level, beyond which operation of the battery, for some length of time, may degrade the battery. Thus, it is generally desirable to keep the output power of a battery at or below the discharge power limit.

Various approaches are provided for adjusting power output from a battery based on the maximum power level. In one example, as shown in U.S. Pat. No. 7,107,956, McGee et al. teaches estimating a discharge power limit for a battery in a hybrid electric vehicle and during conditions when the battery may reach the discharge power limit, reducing the torque provided to the vehicle wheels to reduce the battery power output.

However, the inventors herein have recognized potential issues with such systems. As one example, even if the torque provided to the vehicle wheels is reduced to a threshold torque to reduce battery power output, during lower speed operations such as immediately after an accelerator pedal tip-in, a higher wheel torque corresponding to the threshold torque may be provided but as the vehicle speed increases due to the limited battery discharge power, the wheel torque may rapidly decrease. The decrease in wheel torque may cause the vehicle acceleration to decrease which may adversely affect vehicle speed changes. Therefore, a brief impulse of acceleration (higher wheel torque delivery) may be immediately followed by a drop in acceleration (lower wheel torque delivery) causing drivability issues.

In one example, the issues described above may be addressed by a method for a vehicle, comprising responsive to an output power limit of a battery being lower than a threshold power, selectively limiting a deliverable torque provided to vehicle wheels via an electric machine from the battery, the deliverable torque based on a driver torque demand. In this way, by clipping the torque output to the vehicle wheels further below a maximum deliverable torque output, torque delivery may be sustained over a range of vehicle speeds, thereby improving drivability.

As one example, during operation of a battery powered electric vehicle (BEV), such as in response to an accelerator pedal tip-in at vehicle start, a discharge power limit of a battery supplying power to an electric machine may be estimated based on physical characteristics of the battery, age of the battery, state of charge of the battery, and battery temperature. A deliverable torque output corresponding to the discharge power limit may be estimated. During conditions when the discharge power limit of the battery is lower than a threshold, the actual torque delivered to the vehicle wheels may be clipped lower than the deliverable torque output. The value at which the torque may be clipped may be based on the deliverable torque output and the discharge power limit. While operating the vehicle with a clipped value of torque delivered to the wheels, if the deliverable torque output is demanded by the operator such as during a condition when the vehicle is stuck in mud and peak acceleration is desired to propel the vehicle, the deliverable torque may be then be provided to the vehicle wheels.

In this way, by clipping the torque delivered to wheels below the deliverable torque output during a lower than threshold battery discharge power conditions, a consistent torque output and acceleration may be sustained for a longer duration following an accelerator pedal tip-in. By reducing the possibility of a drop in acceleration at increased vehicle speed followed by an initial peak acceleration, discrete impulses may be reduced during a drive and operator satisfaction may be improved. The technical effect of providing a deliverable torque during specific operator demand is that during conditions when peak vehicle acceleration is desired to move the vehicle, the acceleration may be facilitated, thereby improving drivability and operator satisfaction. Overall, by adjusting an actual torque delivered to the vehicle wheels based on battery discharge power and the corresponding deliverable torque output, accelerations may be sustained for a longer duration and a smoother driving experience may be provided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
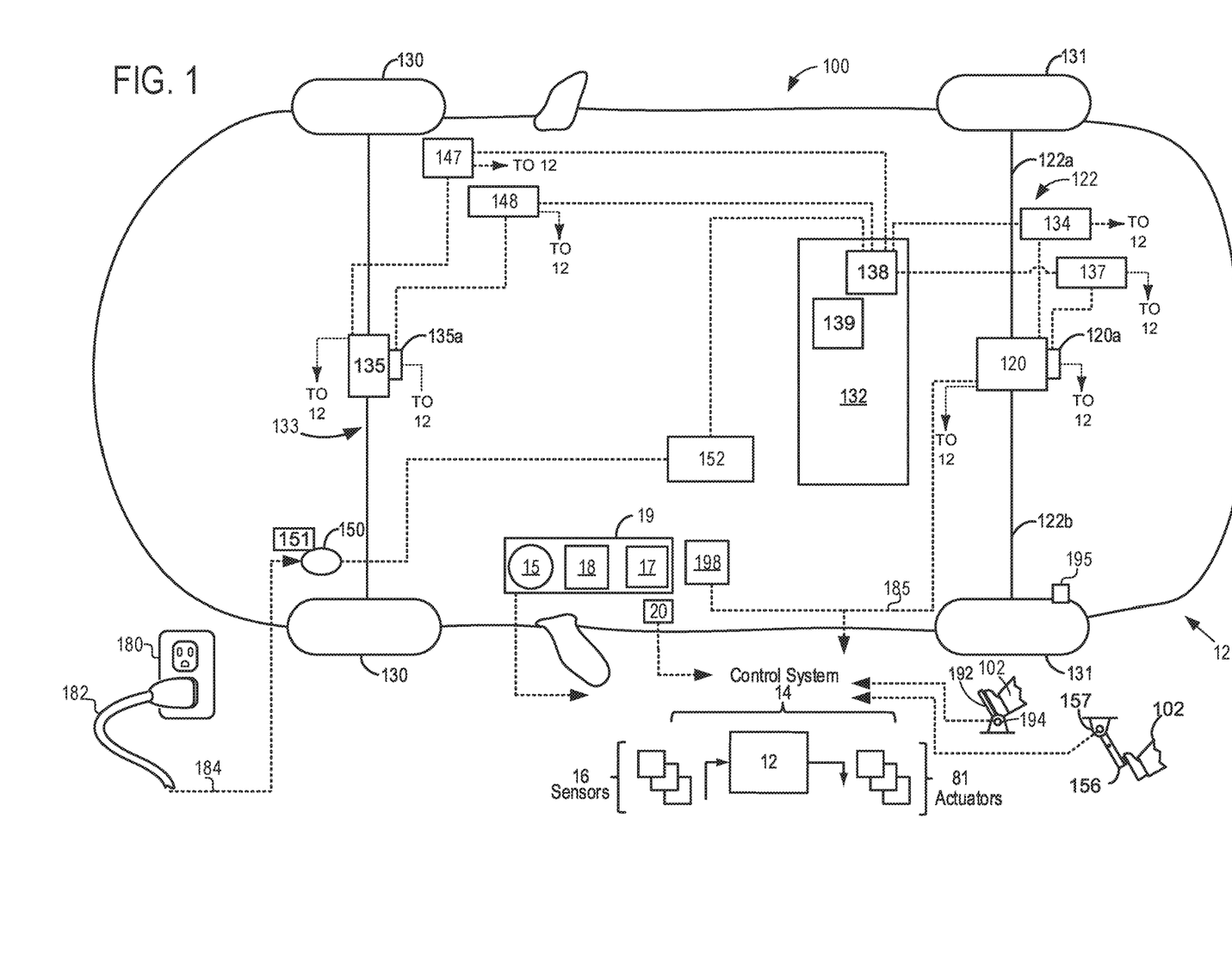
FIG. 1 is a schematic diagram of a vehicle driveline.
Figure 3:
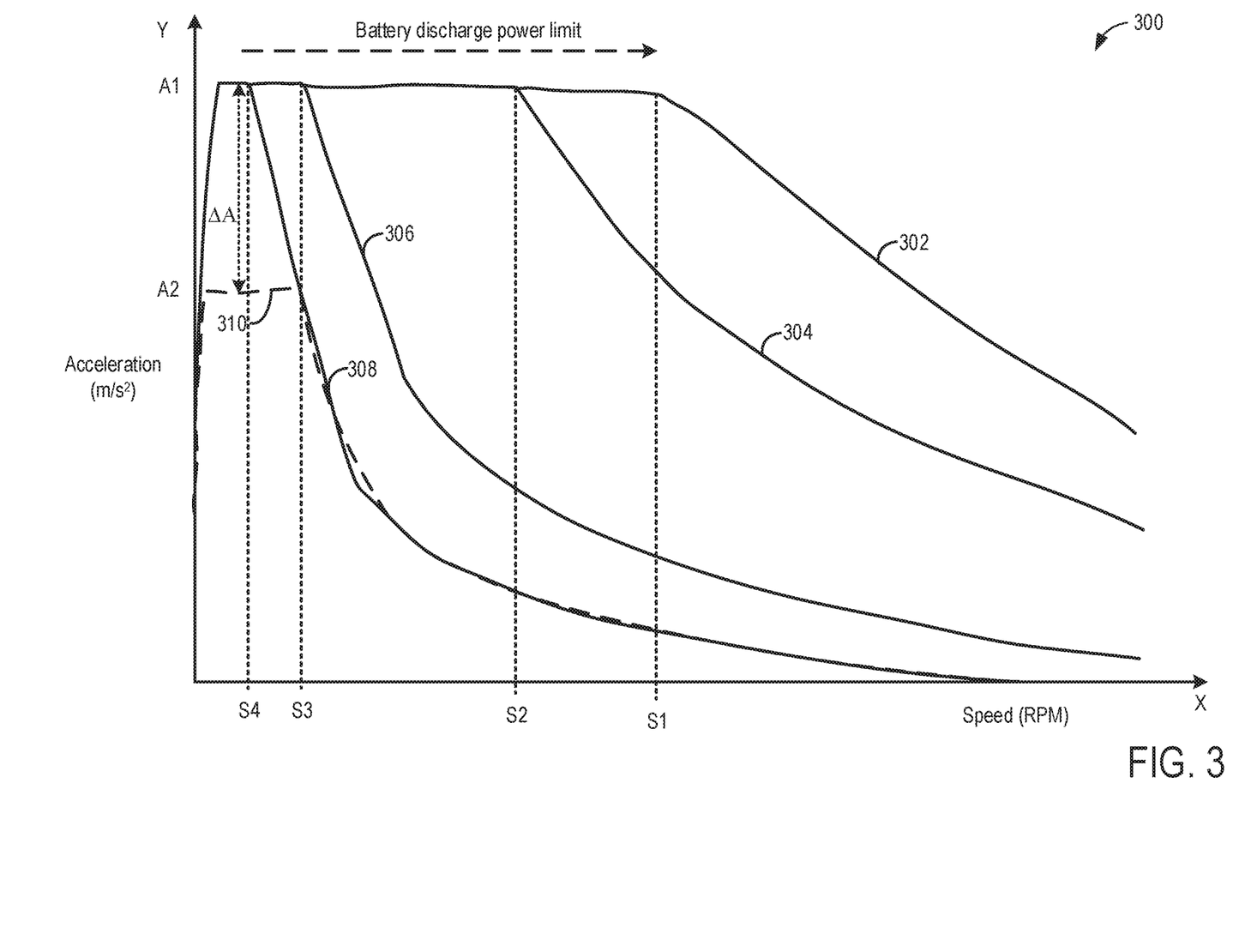
FIG. 3 shows an example plot of torque delivery based on a battery discharge power limit.
Figure 4:
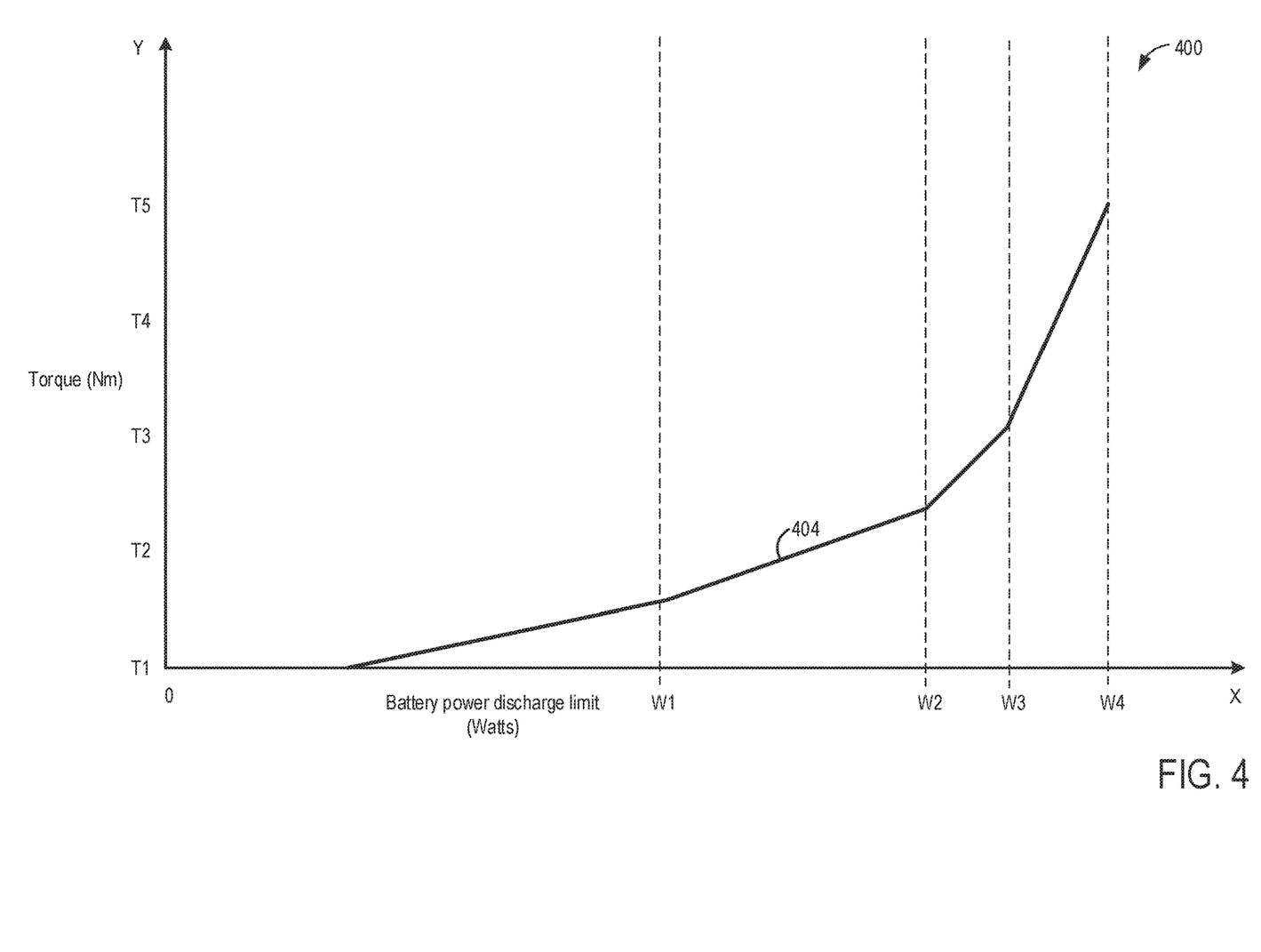
FIG. 4 shows an example plot of torque clipping based on the battery discharge power limit.
Figure 5:
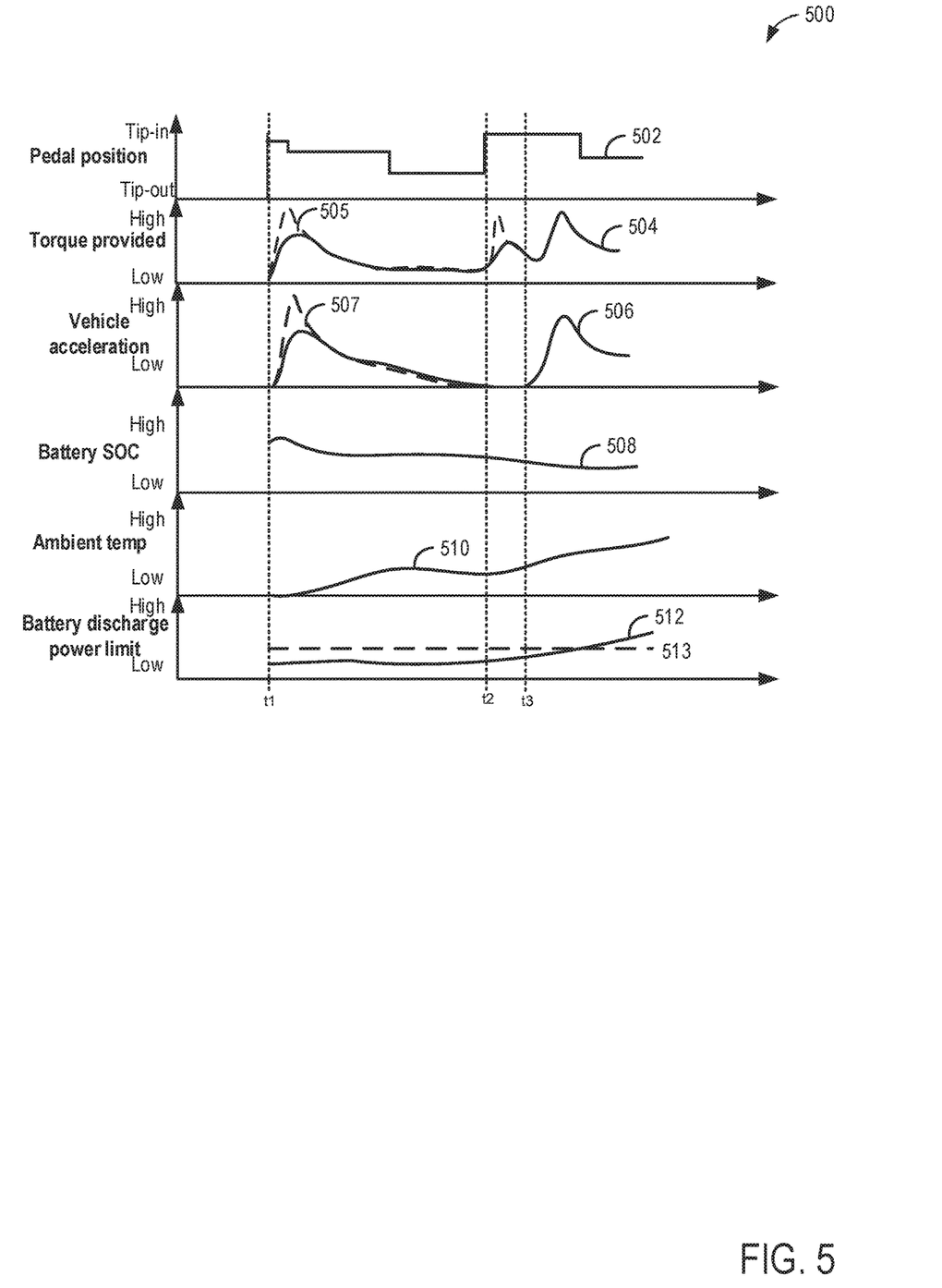
FIG. 5 shows an example timeline of torque delivery based on battery discharge power and torque demand.

The following description relates to systems and methods for operating a battery electric vehicle (BEV) by adjusting torque delivered to the vehicle wheels based on a battery discharge power. FIG. 1 shows an example vehicle system that includes a driveline with one or more electrical propulsion sources. A controller may be configured to perform control routines, such as the example routine of FIG. 2 to selectively clip torque delivered to the vehicle wheels based on battery discharge power limit. FIGS. 3 and 4 show example plots of torque delivery and torque clipping based on the battery discharge power limit, respectively. An example of torque delivery based on battery discharge power is shown in FIG. 5.

FIG. 1 illustrates an example vehicle propulsion system 100 for vehicle 121. Throughout the description of FIG. 1, mechanical connections between various components are illustrated as solid lines, whereas electrical connections between various components are illustrated as dashed lines. Vehicle propulsion system 100 is shown with a first electric machine (e.g., a propulsive force electric machine) 120 and a second electric machine (e.g., a propulsive force electric machine) 135 for propelling vehicle 121. However, in other examples, vehicle 121 may include only one electrical machine for providing propulsive force. In further examples, vehicle 121 may include more than two electrical machine for propelling the vehicle. Electric machine 120 and electric machine 135 are controlled via controller 12. The controller 12 receives signals from the various sensors shown in FIGS. 1 and 2. In addition, controller 12 employs the actuators shown in FIGS. 1 and 2 to adjust driveline operation based on the received signals and instructions stored in memory of controller 12. In some examples, the vehicle propulsion system 100 may include an internal combustion engine (not shown).

Vehicle propulsion system 100 has a front axle 133 and a rear axle 122. In some examples, rear axle may comprise two half shafts, for example first half shaft 122a, and second half shaft 122b. Vehicle propulsion system 100 further includes front wheels 130 and rear wheels 131. In this example, front wheels 130 and/or rear wheels 131 may be driven via electrical propulsion sources. The rear axle 122 is coupled to electric machine 120. Electric machine 120 is shown incorporated into axle 122 and electric machine 135 is shown incorporated into front axle 133. In another embodiment, a single electric machine may be coupled to each of the front axle 133 and the rear axle 122.

Electric machines 120, 120a, 135, and 135a may receive electrical power from onboard electrical energy storage device 132 (also referred herein as battery). Furthermore, electric machines 120 and 135 may provide a generator function to convert the vehicle's kinetic energy into electrical energy, where the electrical energy may be stored at electric energy storage device 132 for later use by the electric machine 120 and/or 135. A first inverter system controller (ISC1) 134 may convert alternating current generated by electric machine 120 to direct current for storage at the electric energy storage device 132 and vice versa. A second inverter system controller (ISC2) 147 may convert alternating current generated by electric machine 135 to direct current for storage at the electric energy storage device 132 and vice versa. A third inverter system controller (ISC3) 137 may convert DC current from electric energy storage device 132 to an alternating current used by electric machine 120a. A fourth inverter system controller (ISC4) 148 may convert DC current from electric energy storage device 132 to an alternating current used by electric machine 135a. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motors), including cabin heating and air conditioning, headlights, cabin audio and video systems, etc.

Control system 14 may communicate with one or more of electric machine 120, torque vectoring electric machine 120a, energy storage device 132, electric machine 135, torque vectoring electric machine 135a, etc. Control system 14 may receive sensory feedback information from one or more of electric machine 135, electric machine 120, energy storage device 132, etc. Further, control system 14 may send control signals to one or more of electric machine 135, torque vectoring electric machine 135a, electric machine 120, torque vectoring electric machine 120a, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in electric vehicle, whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 and electric machine 135 may propel the vehicle by utilizing a stationary electric power source.

Electric energy storage device 132 includes an electric energy storage device controller 139. Electric energy storage device controller 139 may provide charge balancing between energy storage element (e.g., battery cells) and communication with other vehicle controllers (e.g., controller 12).

The electric energy storage device 132 may have a discharge power limit such as a maximum power level, beyond which supply of energy from the electric energy storage device 132, for some length of time, may degrade the device 132. The output power limit of the electric energy storage device 132 may be estimated as a function of a state of charge of the device 132 and an ambient temperature. During conditions when the output power limit of the electric energy storage device 132 is lower than a threshold power, a clipped torque may be delivered to the vehicle wheels. The clipped torque may be lower than a deliverable torque (peak) corresponding to the driver torque demand and the output power limit of the device 132. The clipped torque may be directly proportional to the output power limit of the device 132, the clipped torque decreasing with a decrease in the output power limit of the electric energy storage device 132. The threshold power may be calibrated as a function of the driver torque demand. During limiting the deliverable torque provided to the vehicle wheels, in response to conditions being met for a threshold torque delivery, the deliverable torque may be provided to the vehicle wheels. The conditions for the deliverable torque delivery may include each of an accelerator pedal being engaged for a longer than threshold duration and the vehicle not accelerating over a threshold acceleration. The conditions for the deliverable torque delivery may further include, the output power limit of the electric energy storage device 132 increasing to above the threshold power. During conditions when the output power limit of the electric energy storage device 132 is higher than the threshold, the peak torque may be delivered to the vehicle wheels.

Vehicle propulsion system 100 may also include an ambient temperature/humidity sensor 198. Vehicle propulsion system 100 may further include an accelerometer 20.

Controller 12 may comprise a portion of a control system 14. In some examples, controller 12 may be a single controller of the vehicle. Controller 12 as shown in FIG. 1 maybe a microcomputer, including a microprocessor unit, input/output ports, an electronic storage medium for executable programs (e.g., executable instructions) and calibration values shown as non-transitory read-only memory chip in this particular example, random access memory, keep alive memory, and a data bus. Control system 14 is shown receiving information from a plurality of sensors 16 (various examples of which are described herein) and sending control signals to a plurality of actuators 81 (various examples of which are described herein). As one example, sensors 16 may include wheel speed sensor(s) 195, and ambient temperature/humidity sensor 198.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 135 and electric machine 120) based on an operator input. Various examples of the operator ignition interface 15 may include interfaces that require a physical apparatus, such as an active key, that may be inserted into the operator ignition interface 15 to turn on the vehicle, or may be removed to turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle. Rather, the passive key may need to be located inside or proximate to the vehicle (e.g., within a threshold distance of the vehicle). Still other examples may additionally or optionally use a start/stop button that is manually pressed by the operator to turn the vehicle on or off. In other examples, a remote vehicle start may be initiated remote computing device (not shown), for example a cellular telephone, or smartphone-based system where a user's cellular telephone sends data to a server and the server communicates with the vehicle controller 12 to start the vehicle.

In this way, the systems of FIG. 1 enable a system for an electrically propelled vehicle, comprising an energy storage device supplying power to one or more electric machines, a controller including executable instructions stored in non-transitory memory to during a first accelerator pedal tip-in when an output power limit of the energy storage device is lower than a threshold, deliver a reduced torque from the one or more electric machines to vehicle wheels, the reduced torque lower than a deliverable torque output from the energy storage device. The delivered reduced torque may be ramped to the deliverable torque output at a constant rate in response to a second accelerator pedal tip-in for a longer than threshold duration with a lower than threshold increase in acceleration, the second accelerator pedal tip-in occurring subsequent to the first accelerator pedal tip-in during vehicle operation with a reduced torque delivered to the vehicle wheels.

Figure 2:
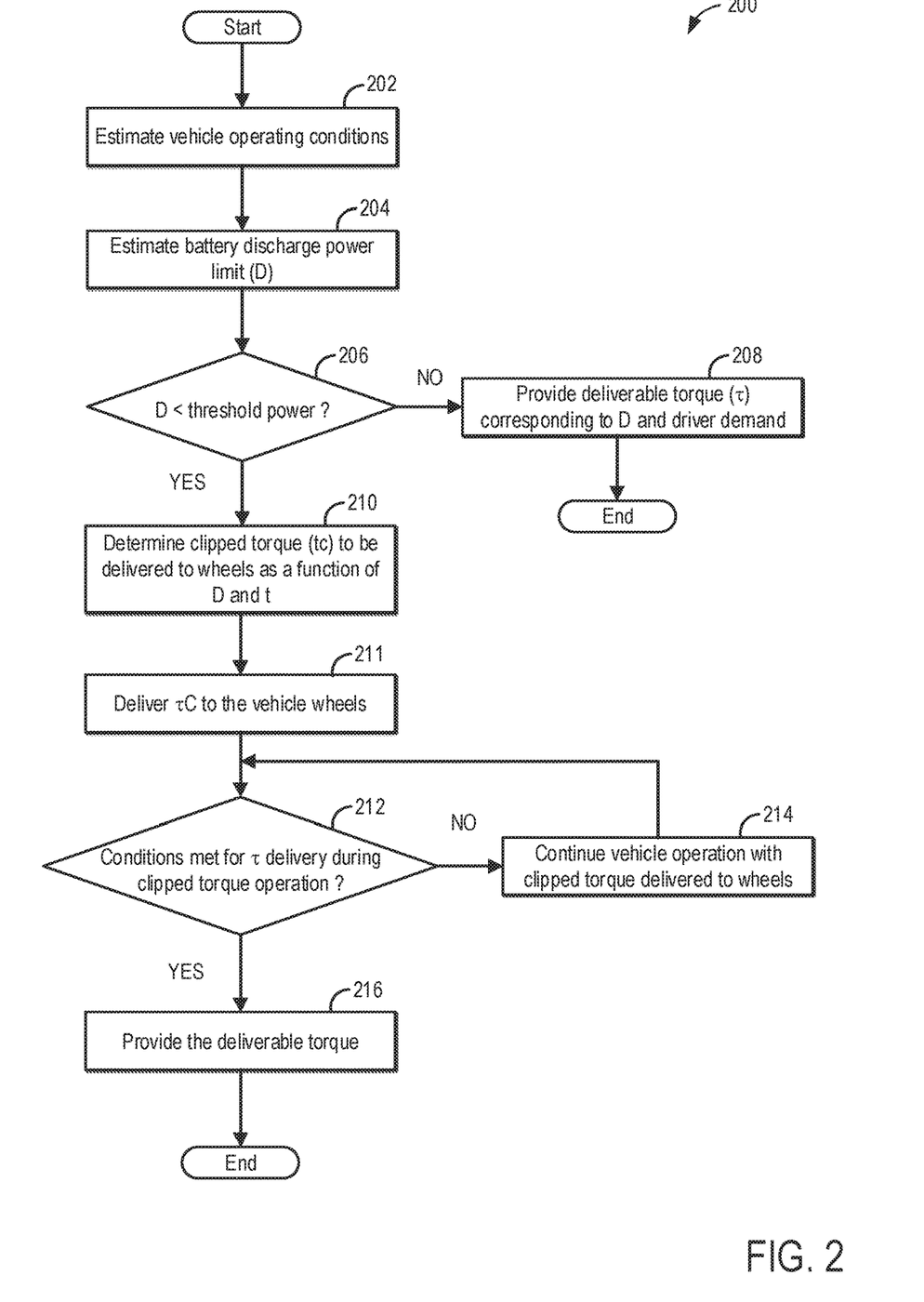
FIG. 2 is a flowchart of a method for torque clipping based on a battery discharge power limit.

FIG. 2 shows an example method 200 for torque clipping based on a discharge power of an energy storage device (such as energy storage device/battery 132 in FIG. 1). The method of FIG. 2 may be incorporated into and may cooperate with the system of FIG. 1. Further, at least portions of the method of FIG. 2 may be incorporated as executable instructions stored in non-transitory memory while other portions of the method may be performed via a controller transforming operating states of devices and actuators in the physical world.

At 202, vehicle operating conditions are estimated. The controller may determine that the vehicle is activated if a vehicle activation request has been made via a human or autonomous driver. The vehicle activation request may be received via a human/machine interface directly receiving input from a human driver or via a key fob or other device entering a predetermined proximity of the vehicle (e.g., within 5 meters of the vehicle). The operating conditions may include accelerator pedal position, brake pedal position, vehicle speed, torque delivered to the vehicle wheels, etc. A state of charge (SOC) of the battery and an age of the battery may also be determined by the controller. Ambient conditions such as ambient temperature, pressure, humidity, etc. may also be estimated.

At 204, a discharge power limit (D) of the battery may be estimated. The discharge power limit is a maximum power level, beyond which operation of the battery, for some length of time, may degrade the battery. The controller may determine the discharge power limit of a battery based on physical characteristics of the battery cells (such as individual cell voltages and temperatures), age of the battery, state of charge (SOC) of the battery, and battery temperature. The discharge power limit may decrease when the battery temperature is lower than a first threshold temperature or the battery temperature is higher than a second threshold temperature, the second threshold temperature higher than the first threshold temperature. In one example, the first threshold temperature may be 5° C. In another example, the second threshold temperature may be 45° C. As an example, at vehicle start after a period of inactivity, the battery temperature may be the ambient temperature. The discharge power limit may be inversely proportional to battery age such that D decreases with an increase in battery age. As another example, the discharge power limit may be directly proportional to battery SOC such as D decrease with a decrease in battery SOC. In one example, the controller may use a look-up table to determine D for a battery with given physical characteristics with age of battery, SOC, and battery temperature as input and D as output. During operation of the vehicle using motor torque (the motor powered by the battery), the battery output power is limited within the battery discharge power limit.

At 206, the routine includes determining if the discharge power limit (D) of the battery is lower than a threshold power. The threshold power may be calibrated based on torque capability and a weight of the vehicle. The torque capability may be a maximum possible torque deliverable from the on-board battery. If it is determined that the discharge power limit (D) of the battery is higher than the threshold power, it is inferred that a deliverable torque corresponding to the discharge power limit (D) of the battery may be provided from the battery to the electric motor.

At 208, a deliverable torque (τ) corresponding to D may be provided to the vehicle wheels. The delivered torque may be a magnitude of driver demand up to a torque that may be delivered from the battery to the vehicle wheels via the electric machine corresponding to D. The deliverable torque may be a magnitude of a torque that may be delivered from the battery to the vehicle wheels via the electric machine corresponding to D and torque demand. The motor may deliver a deliverable torque torque (also referred herein as peak torque or threshold torque) to the vehicle wheels. The controller may determine the deliverable torque (τ) to be provided based on an operator requested torque (torque demand) and the battery discharge power limit (D) such that the power delivered from the battery does not exceed D, whichever is more restrictive. Other factors that may be considered by the controller in estimating the deliverable torque (τ) may include electric motor speed, motor temperature, etc. The delivered torque may be the driver demanded torque. In one example, at a given rotational speed of the vehicle wheel, the deliverable torque (τ) may be lower than the maximum torque corresponding to the battery discharge power limit (D). In another example, at a given rotational speed of the vehicle wheel, the deliverable torque (τ) may be equal to the torque corresponding to the battery discharge power limit (D). The torque to be delivered to the vehicle wheels may be determined based on equation 1.

$$\tau = \frac{P}{\omega}; \qquad \text{(equation 1)}$$

where τ is the deliverable torque delivered from one or more electric motors (such as first electric machine 120 and second electric machine 135 in FIG. 2) coupled to the axles of the vehicle wheels to the wheels, P is the power delivered from the battery which may be equal to or lower than the battery discharge power D, and ω is the rotational speed (RPM) of the vehicle wheels. As an example, the controller may use a look-up table to determine the deliverable torque (τ) with D and ω as inputs and τ as the output.

If it is determined that that discharge power limit (D) of the battery is lower than the threshold power, at 210, a clipped torque (τc) to be delivered to the vehicle wheel may be determined based on D and the deliverable torque (τ) corresponding to D and the current rotational speed (w) of the vehicle wheels. The clipped torque may be lower than the deliverable torque. In one example, the controller may use a look-up table or a plot to determine the clipped torque (τc) to be delivered to the vehicle wheel.

FIG. 4 shows an example plot 400 of torque clipping based on battery discharge power limit. The x-axis denotes battery discharge power limit (in Watts) and the y-axis denotes torque (in Nm) delivered to the vehicle wheels.

In this example, W4 is the threshold battery discharge power limit below which the torque delivered to the wheels may be clipped from the corresponding deliverable torque. In one example, the threshold battery discharge power limit may be 175000 Watts. In this example, a deliverable torque of T5 corresponds to the threshold battery discharge power limit of W4. In one example, T5 may be 7000 Nm. As seen from line 404, the torque delivered to the wheels change non-linearly with a change in battery discharge power limit. The torque output may be progressively decreased with a decrease in the battery discharge power limit until a lower threshold torque (in this example T1) In one example, T1 may be 3000 Nm. is reached below which the torque output delivered to the wheels is no further decreased.

Acceleration of the vehicle may be directly proportional to the torque delivered to the vehicle wheels. By clipping the torque delivered to wheels below the deliverable torque during discharge power conditions lower than the threshold power, a deliverable torque output and acceleration may be sustained for a longer duration following an accelerator pedal tip-in. By reducing the possibility of a drop in acceleration at increased vehicle speed followed by an initial peak acceleration, discrete impulses may be reduced during a drive and operator satisfaction may be improved.

Returning to FIG. 2, at 211, the clipped torque (τc) determined at step 210 may be delivered to the vehicle wheels via the electric motor coupled to the wheels axels. The power delivered from the battery may be directly proportional to the torque delivered. Hence, during delivery of the clipped torque, the power supplied from the battery may be lowered from the battery output power limit. In one example, a single electric motor may be coupled to each axle of the vehicle and the single motor may deliver the clipped torque to each of the axles. In another example, separate electric motors may be coupled to the each axle of the vehicle and the total (sum) torque delivered to both axles may be the clipped torque.

FIG. 3 shows an example plot 300 of vehicle acceleration caused by torque delivered based on discharge power limit of the battery. The x-axis denotes rotational speed (RPM) of the vehicle wheels and the y-axis denotes vehicle acceleration (in m/s$^2$). Vehicle acceleration may be directly proportional to the torque delivered to the vehicle wheels from the battery via the electric motor.

The first plot, line 302, corresponds to acceleration delivered corresponding to a first, highest battery discharge power limit. The second plot, line 304, corresponds to acceleration delivered corresponding to a second, medium battery discharge power limit. The third plot, line 306, corresponds to acceleration delivered corresponding to a third, lower battery discharge power limit. The fourth plot, line 308 corresponds to peak acceleration deliverable corresponding to a lower than threshold battery discharge power limit. As seen from the plot, as the battery discharge power limit decreases, the duration of sustainability of the peak acceleration (A1) decreases. For the first plot, 302, the peak acceleration may be sustained until a first speed of S1, for the second plot, 304, the peak acceleration may be sustained until a second speed of S2, for the third plot, 306, the peak acceleration may be sustained until a third speed of S3, wherein the first speed is higher than each of the second speed and the third speed, and the second speed is higher than the third speed. From the fourth plot, 308 it is observed that at the lowest battery discharge power limit, the peak acceleration may only be sustained until a fourth speed of S4 which is lower than the third speed S3. Following an accelerator pedal tip-in, drop off of the peak acceleration may result in poor drivability due to the power delivery resembling an impulse, which may result in a jerky sensation for the vehicle operator. A force of the jerky sensation may be in a direction of travel of the vehicle, which may be parallel to a longitudinal axis of the vehicle.

Therefore, to improve drivability, during conditions when the battery discharge power is lower than the threshold power (as defined in step 206 of FIG. 2), as shown by dashed line 310, the torque delivered to the wheels may be clipped (lowered) from a deliverable (peak) torque corresponding to the battery discharge power limit. The value of the clipped torque may be a function of the battery discharge power limit. The clipped deliverable torque may correspond to a lowered peak acceleration, A2. By decreasing the peak acceleration (by an amount ΔA) from a higher value A1 to a lower value A2, the lower peak acceleration A2 may be sustained until the third speed S3 is reached. By sustaining the acceleration for a longer duration and up to a higher vehicle speed (relative to plot 308), drivability may be improved. The decrease in peak acceleration (ΔA) may be directly proportional to the difference between the clipped torque and the maximum permissible torque delivered from the battery corresponding to a lower than threshold battery discharge power limit.

Returning to FIG. 2, at 212, the routine includes determining if conditions are met for providing a deliverable torque (t) during vehicle operation with clipped value of torque being delivered to the vehicle wheels. The conditions may include a sudden increased operator torque demand characterized by the accelerator pedal being engaged for a longer than threshold time period without the vehicle accelerating over a threshold acceleration. In one example, the accelerator may be engaged for over 300 milliseconds without the vehicle accelerating more than 0.25 m/s$^2$. As an example, the vehicle may be stuck in mud (an obstacle) or climbing a steep hill and there may be a sudden increase in torque demand for a shorter duration to overcome the obstacle or to climb the hill. During operation of the vehicle with the clipped torque being delivered to the wheels due to the lower than threshold battery output torque limit, the torque may not be sufficient to fulfill the sudden increase in operator torque demand.

The conditions for deliverable torque delivery during vehicle operation with clipped value of torque being delivered to the vehicle wheels may also include the battery discharge power limit increasing to above the threshold power. As an example, during a vehicle start at a lower than threshold ambient temperature, the battery discharge power limit may be lower due to the lower ambient/battery temperature. However, after vehicle has operated for a duration and/or the vehicle has travelled to a location with a higher ambient temperature, the battery discharge power limit may increase to above the threshold, and clipping of torque below the maximum permissible torque may be no longer be desired for drivability concerns.

If it is determined that conditions are not met for providing a deliverable torque, at 214, vehicle operation may be continued with clipped torque delivered to the vehicle wheels. If the battery discharge power limit changes (such as due to change in ambient temperature, battery SOC), the value of the clipped torque supplied to the vehicle wheels may be adjusted accordingly. As an example, if the battery discharge power limit further decreases, the value of the clipped torque delivered to the wheels may be further reduced from the maximum permissible torque output.

If it is determined that that that conditions are met for providing a deliverable torque during vehicle operation with clipped value of torque being delivered to the vehicle wheels, at 216, a deliverable torque (τ) corresponding to a current battery discharge power limit (D) may be provided to the vehicle wheels. The motor may provide a deliverable torque (also referred herein as peak torque or threshold torque) to the vehicle wheels. The controller may determine the deliverable torque (τ) corresponding to the battery discharge power limit (D) such that the power delivered from the battery does not exceed D. In one example, the torque output may be increased from the clipped torque (τc) to the deliverable torque (τ) at a pre-calibrated constant rate. As an example, the torque output may be increased at a rate of 1000 Nm/s. In another example, torque output may be increased from the clipped torque (τc) to the deliverable torque (τ) at a variable rate with the rate changing during the ramping process. By delivering the deliverable torque, the peak acceleration provided may be increased to overcome any obstacle and/or to climb a slope.

In this way, during a first condition, an operator torque demand may be delivered from an electric machine, and during a second condition, a clipped torque output based on the operator torque demand and the output power limit of the battery may be delivered from the electric machine, the clipped torque being lower than the operator torque demand. The first condition may include the output power limit of the battery being higher than a threshold, and the second condition may include the output power limit of the battery being lower than a threshold, the operator torque demand being equal in each of the first condition and the second condition.

FIG. 5 shows an example timeline 500 illustrating adjusting torque output based on a battery discharge power limit. The horizontal (x-axis) denotes time and the vertical markers t1-t3 identify significant times in the routine for torque output power adjustment.

The first plot, line 502, shows a change in accelerator pedal position as estimated via a pedal position sensor. The second plot, line 504, shows a magnitude of actual motor torque delivered (torque output) from a battery to the vehicle wheels via one or more electric motors. Dashed line 505 denotes a deliverable torque that may be provided corresponding to a current battery discharge power limit. The third plot, line 506, shows vehicle acceleration proportional to the torque output. The fourth plot, line 508, shows a state of charge (SOC) of the battery powering the vehicle via the electric motor(s). The fifth plot, line 510, shows am ambient temperature as estimated via an ambient temperature sensor. The sixth plot, line 512, shows a battery discharge power limit as estimated as a function of the battery SOC and ambient temperature. Dashed line 513 denote a threshold battery discharge power limit below which the battery output power may be lowered and the torque output may be clipped to below a deliverable torque corresponding to the battery discharge power limit. The threshold battery discharge power limit may be calibrated based on the pedal position. The deliverable torque may be directly proportional to the battery discharge power limit.

Prior to time t1, the vehicle is not operated. At time t1, the vehicle is started in response to a key-on and an accelerator pedal tip-in. The battery discharge power limit is estimated based on the current battery SOC and the ambient temperature. A deliverable torque provided to the vehicle wheels may also be estimated. Dashed line 513 denotes the deliverable torque corresponding to the current battery discharge power limit. In response to the estimated battery discharge power limit being lower than the threshold power 513, the torque delivered to the vehicle wheels may be clipped (shown by solid line 504) to below the deliverable torque. By lowering the torque delivered to the vehicle wheels to below the deliverable torque, the acceleration following a tip-in may be sustained for a longer duration, thereby improving drivability. If instead of the clipped torque, the deliverable torque was actually provided to the vehicle wheels, the resulting acceleration, as shown by dashed line 507, would have dropped within a shorter time relative to the current vehicle acceleration (solid line 506) which might have hindered a smooth driving experience.

While the battery discharge power limit continues to remain below the threshold 513 and the clipped value of torque (lowered from the deliverable torque value) is supplied to the vehicle wheels, at time t2, it is observed the vehicle acceleration reduces to zero during a vehicle tip-in. The clipped torque provided may not be sufficient to accelerate the vehicle. In response to the tip-in and the corresponding acceleration being zero for a duration (such as the duration between time t2 and t3), at time t3, in order to accelerate the vehicle, the deliverable torque corresponding to the current battery discharge power limit is delivered (instead of the clipped torque) even with the current battery discharge power limit being lower than the threshold 513. The output torque is ramped from the lower clipped torque to the higher deliverable torque at a pre-calibrated constant rate.

After time t3, in response to the higher torque delivered to the wheels, the vehicle may accelerate. Subsequently, due to an increase in ambient temperature, the battery discharge power limit increases to above the threshold 513 and clipping of output torque is no longer desired to improve drivability.

In this way, by reducing the torque delivered to the vehicle wheels during a lower than threshold battery discharge power conditions, a higher magnitude of acceleration may be sustained for a longer duration and over a range of vehicle speeds, thereby improving operator satisfaction via enhanced ride comfort. The technical effect of instantaneously increasing the torque output if the vehicle is stuck or is climbing a hill is that the vehicle may overcome the obstacle without any significant delay. Overall, by adjusting an actual torque delivered to the vehicle wheels based on battery discharge power and the corresponding the deliverable torque output, accelerations may be sustained for a longer duration and a smoother driving experience may be provided.

In one example, a method for a vehicle, comprises: responsive to an output power limit of a battery being lower than a threshold power, selectively limiting a deliverable torque provided to vehicle wheels via an electric machine from the battery, the deliverable torque based on a driver torque demand. In the preceding example method, additionally or optionally, the deliverable torque is further based on the output power limit of the battery. In any or all of the preceding examples, additionally or optionally, limiting the deliverable torque includes delivering a clipped torque to the vehicle wheels, the clipped torque lower than the deliverable torque. In any or all of the preceding examples, additionally or optionally, the clipped torque is a function of the output power limit of the battery, the rotational speed of the vehicle wheels, and the deliverable torque. In any or all of the preceding examples, additionally or optionally, the clipped torque is directly proportional to the output power limit of the battery, the clipped torque decreasing with a decrease in the output power limit of the battery. In any or all of the preceding examples, additionally or optionally, the threshold power is calibrated as a function of torque capability and a weight of the vehicle. In any or all of the preceding examples, the method further comprising, additionally or optionally, responsive to the output power limit of the battery being higher than the threshold power, providing the deliverable torque to the vehicle wheels. In any or all of the preceding examples, the method further comprising, additionally or optionally, during selectively limiting the deliverable torque provided to the vehicle wheels, in response to conditions being met for providing a deliverable torque, providing the deliverable torque to the vehicle wheels. In any or all of the preceding examples, additionally or optionally, the conditions for providing the deliverable torque include each of an accelerator pedal being engaged for a longer than threshold duration and the vehicle not accelerating over a threshold acceleration. In any or all of the preceding examples, additionally or optionally, the conditions for providing the deliverable torque further include, the output power limit of the battery increasing to above the threshold power. In any or all of the preceding examples, additionally or optionally, the output power limit of the battery is a function of a state of charge of the battery and an ambient temperature. In any or all of the preceding examples, additionally or optionally, the vehicle is a battery electric vehicle (BEV) and wherein the battery supplies power to the electric machine for vehicle propulsion.

Another example method for a vehicle comprises: during a first condition, delivering from an electric machine, an operator demanded torque, and during a second condition, delivering from the electric machine, a clipped torque output based on the operator demanded torque and the output power limit of the battery, the clipped torque being lower than the operator demanded torque. In the preceding example method, additionally or optionally, the first condition includes the output power limit of the battery being higher than a threshold, and wherein the second condition includes the output power limit of the battery being lower than a threshold, the operator torque demand being equal in each of the first condition and the second condition. In any or all of the preceding examples, the method further comprising, additionally or optionally, during a third condition, independent of the output power limit of the battery, ramping a torque output of the electric machine from the clipped torque output to the operator demanded torque at a constant rate. In any or all of the preceding examples, additionally or optionally, the third condition includes, during operation of the vehicle with the clipped torque output, each of an accelerator pedal being engaged for a longer than threshold time period and the vehicle not accelerating over a threshold acceleration. In any or all of the preceding examples, additionally or optionally, the clipped torque output is reduced non-linearly with a reduction in battery output power limit until a lower threshold torque is reached, the clipped torque maintained at the threshold torque upon further reduction in the battery output power limit.

Another example system for an electrically propelled vehicle comprises: an energy storage device supplying power to one or more electric machines, a controller including executable instructions stored in non-transitory memory to: during a first accelerator pedal tip-in when an output power limit of the energy storage device is lower than a threshold, deliver a reduced torque from the one or more electric machines to vehicle wheels, the reduced torque lower than a deliverable torque output from the electric machines. In the preceding example method, the system further comprising, additionally or optionally, the controller including additional instructions to: ramp the delivered reduced torque to the deliverable torque output at a constant rate in response to a second accelerator pedal tip-in for a longer than threshold duration with a lower than threshold increase in acceleration, the second accelerator pedal tip-in occurring subsequent to the first accelerator pedal tip-in during vehicle operation with a reduced torque delivered to the vehicle wheels. In any or all of the preceding examples, additionally or optionally, the output power limit of the energy storage device is estimated as a function of an age of the energy storage device, an ambient temperature as estimated via an ambient temperature sensor, and a state of charge of the energy storage device.

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other vehicle hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
responsive to an output power limit of a battery being lower than a threshold power, selectively limiting a deliverable torque provided to vehicle wheels via an electric machine from the battery, the deliverable torque based on a driver torque demand.

2. The method of claim 1, wherein the deliverable torque is further based on the output power limit of the battery.

3. The method of claim 1, wherein limiting the deliverable torque includes delivering a clipped torque to the vehicle wheels, the clipped torque lower than the deliverable torque.

4. The method of claim 3, wherein the clipped torque is a function of the output power limit of the battery, the rotational speed of the vehicle wheels, and the deliverable torque.

5. The method of claim 3, wherein the clipped torque is directly proportional to the output power limit of the battery, the clipped torque decreasing with a decrease in the output power limit of the battery.

6. The method of claim 1, wherein the threshold power is calibrated as a function of torque capability and a weight of the vehicle.

7. The method of claim 1, further comprising, responsive to the output power limit of the battery being higher than the threshold power, providing the deliverable torque to the vehicle wheels.

8. The method of claim 1, further comprising, during selectively limiting the deliverable torque provided to the vehicle wheels, in response to conditions being met for providing a deliverable torque, providing the deliverable torque to the vehicle wheels.

9. The method of claim 8, wherein the conditions for providing the deliverable torque include each of an accelerator pedal being engaged for a longer than threshold duration and the vehicle not accelerating over a threshold acceleration.

10. The method of claim 8, wherein the conditions for providing the deliverable torque further include, the output power limit of the battery increasing to above the threshold power.

11. The method of claim 1, wherein the output power limit of the battery is a function of a state of charge of the battery and an ambient temperature.

12. The method of claim 1, wherein the vehicle is a battery electric vehicle (BEV) and wherein the battery supplies power to the electric machine for vehicle propulsion.

13. A method for a vehicle, comprising:
during a first condition, delivering from an electric machine, an operator demanded torque; and
during a second condition, delivering from the electric machine, a clipped torque output based on the operator demanded torque and the output power limit of the battery, the clipped torque being lower than the operator demanded torque.

14. The method of claim 13, wherein the first condition includes the output power limit of the battery being higher than a threshold, and wherein the second condition includes the output power limit of the battery being lower than a threshold, the operator torque demand being equal in each of the first condition and the second condition.

15. The method of claim 13, further comprising, during a third condition, independent of the output power limit of the battery, ramping a torque output of the electric machine from the clipped torque output to the operator demanded torque at a constant rate.

16. The method of claim 13, wherein the third condition includes, during operation of the vehicle with the clipped torque output, each of an accelerator pedal being engaged for a longer than threshold time period and the vehicle not accelerating over a threshold acceleration.

17. The method of claim 13, wherein the clipped torque output is reduced non-linearly with a reduction in battery output power limit until a lower threshold torque is reached, the clipped torque maintained at the threshold torque upon further reduction in the battery output power limit.

18. A system for an electrically propelled vehicle, comprising:
an energy storage device supplying power to one or more electric machines;
a controller including executable instructions stored in non-transitory memory to:
during a first accelerator pedal tip-in when an output power limit of the energy storage device is lower than a threshold, deliver a reduced torque from the one or more electric machines to vehicle wheels, the reduced torque lower than a deliverable torque output from the electric machines.

19. The system of claim 18, further comprising, the controller including additional instructions to: ramp the delivered reduced torque to the deliverable torque output at a constant rate in response to a second accelerator pedal tip-in for a longer than threshold duration with a lower than threshold increase in acceleration, the second accelerator pedal tip-in occurring subsequent to the first accelerator pedal tip-in during vehicle operation with a reduced torque delivered to the vehicle wheels.

20. The system of claim 18, wherein the output power limit of the energy storage device is estimated as a function of an age of the energy storage device, an ambient temperature as estimated via an ambient temperature sensor, and a state of charge of the energy storage device.

* * * * *